United States Patent
Xiong et al.

(10) Patent No.: US 12,466,059 B2
(45) Date of Patent: Nov. 11, 2025

(54) CLUTCH ADAPTED FOR EXOSKELETON AND ANKLE JOINT ASSISTED EXOSKELETON

(71) Applicant: HUAZHONG UNIVERSITY OF SCIENCE AND TECHNOLOGY, Hubei (CN)

(72) Inventors: Cai-Hua Xiong, Hubei (CN); Tao Wang, Hubei (CN); Di Hu, Hubei (CN); Jie jun yi Liang, Hubei (CN); Yuhao Li, Hubei (CN); Tian-Cheng Zhou, Hubei (CN); Wen-Bin Chen, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 791 days.

(21) Appl. No.: 17/864,355

(22) Filed: Jul. 13, 2022

(65) Prior Publication Data
US 2023/0150122 A1    May 18, 2023

(30) Foreign Application Priority Data
Nov. 18, 2021   (CN) .......................... 202111371470.5

(51) Int. Cl.
*B25J 9/00*     (2006.01)
*A61H 1/02*     (2006.01)
(Continued)

(52) U.S. Cl.
CPC .......... *B25J 9/0006* (2013.01); *A61H 1/0266* (2013.01); *B25J 9/109* (2013.01);
(Continued)

(58) Field of Classification Search
CPC ...... A61H 1/0262; A61H 1/0266; A61H 3/00; A61H 2201/1445; B25J 9/0006;
(Continued)

(56) References Cited

U.S. PATENT DOCUMENTS

2013/0046218 A1*  2/2013  Wiggin ................ A61F 5/0127
                                              602/16

FOREIGN PATENT DOCUMENTS

CN    106625605 A  *  5/2017  ............... A61H 3/00
CN    107126348 A  *  9/2017  ............... A61H 3/00
(Continued)

OTHER PUBLICATIONS

CN 106625605 A machine translation accessed Sep. 6, 2025 (Year: 2025).*

(Continued)

*Primary Examiner* — Victoria Murphy
*Assistant Examiner* — Kelsey Rhee
(74) *Attorney, Agent, or Firm* — JCIPRNET (57) ABSTRACT

A clutch adapted for an exoskeleton includes lower and upper base plates, a roller, a roller ratchet ring, a trigger, a pawl, a pawl spring, a trigger torsional spring, a trigger positioning shaft, and a pawl positioning shaft. Two ends of the trigger positioning shaft are respectively connected to the upper and lower base plates. The trigger and the trigger torsional spring are sleeved on the trigger positioning shaft. Two ends of the trigger torsional spring are respectively connected to the lower base plate and the trigger. Two ends of the pawl positioning shaft are connected to the lower and upper base plates. The pawl spring and the pawl are respectively sleeved on the pawl positioning shaft. Two ends of the roller are rotatably connected to the lower and upper base plates. The pawl is detachably connected to the roller ratchet ring. The trigger is movably connected to the pawl.

10 Claims, 7 Drawing Sheets

(51) Int. Cl.
*A61H 3/00* (2006.01)
*B25J 9/10* (2006.01)

(52) U.S. Cl.
CPC .......... *A61H 3/00* (2013.01); *A61H 2003/007* (2013.01); *A61H 2201/1445* (2013.01)

(58) Field of Classification Search
CPC ........ B25J 9/1638; B25J 9/109; A61F 5/0127; A61F 5/0123; A61F 2005/0155; F16D 41/12; F16D 41/04
See application file for complete search history.

(56) References Cited

FOREIGN PATENT DOCUMENTS

| CN | 109528451 | A | * | 3/2019 | ............... | A61H 1/00 |
| CN | 109571541 | A | * | 4/2019 | ............... | B25J 17/02 |
| CN | 110292506 | A | * | 10/2019 | ............... | A61B 5/112 |
| CN | 111000706 | A | * | 4/2020 | ............... | A61H 3/00 |
| CN | 112190446 | A | * | 1/2021 | ............... | A61H 3/00 |
| CN | 112936228 | A | * | 6/2021 | ............ | B25J 9/0006 |

OTHER PUBLICATIONS

CN 107126348 A machine translation accessed Sep. 6, 2025 (Year: 2025).*
CN 109528451 A machine translation accessed Sep. 6, 2025 (Year: 2025).*
CN 109571541 A machine translation accessed Sep. 6, 2025 (Year: 2025).*
CN 110292506 A machine translation accessed Sep. 6, 2025 (Year: 2025).*
CN 111000706 A machine translation accessed Sep. 6, 2025 (Year: 2025).*
CN 112190446 A machine translation accessed Sep. 6, 2025 (Year: 2025).*
CN 112936228 A machine translation accessed Sep. 6, 2025 (Year: 2025).*

* cited by examiner

0% gait

FIG. 8(a)

12% gait

FIG. 8(b)

36% gait

FIG. 8(c)

45% gait

FIG. 8(d)

61% gait

FIG. 8(e)

CLUTCH ADAPTED FOR EXOSKELETON AND ANKLE JOINT ASSISTED EXOSKELETON

CROSS-REFERENCE TO RELATED APPLICATION

This application claims the priority benefit of China application no. 202111371470.5, filed on Nov. 18, 2021. The entirety of the above-mentioned patent application is hereby incorporated by reference herein and made a part of this specification.

BACKGROUND

Technical Field

The disclosure belongs to the technical field of lower extremity exoskeletons, and more particularly relates to a clutch adapted for exoskeleton and ankle joint assisted exoskeleton.

Description of Related Art

With the development of society and the advancement of science and technology, people begin to pursue the use of external devices to assist the arduous and complex work encountered in daily life. As a human wearable device, exoskeleton is a new type of robot that integrates gait analysis, mechatronics, biomechanics and technologies of many other fields. Exoskeleton may be widely used in military, medical and elderly assistance. In the military field, exoskeleton may improve the combat capability of individual soldiers, enhance the load-bearing capacity, and increase the walking distance. In the medical field, exoskeleton may help patients to walk with healthy gait and assist disabled people to walk. In the field of elderly assistance, exoskeleton may assist the elderly, who have physical disability due to old age, to travel.

Walking is one of the most common daily activities of human beings. The development of various means of transportation facilitates people's travel. However, due to the restrictions of various terrains, people still need to rely on walking about 10,000 steps per day on average for transportation. Walking is inevitable in people's daily life. Among the joints of the human body, the ankle joint is the joint closest to the ground, and bears almost the entire body weight of the human body, especially when a person is jumping, running and carrying weight, the ankle joint bears a considerable level of impact and loads. In addition, in the process of walking, the ankle joint of human body does the most work among various joints of the lower limb, accounting for nearly 50% of work. At present, the major ankle joints are active exoskeletons. Active exoskeletons tend to be heavier in system, which brings greater additional consumption to users, and active exoskeletons are also constrained by electricity; while passive exoskeletons are relatively light and the reliability is high. Passive exoskeletons utilize the law of human walking to cleverly collect energy for power assistance, the energy utilization rate is improved, and the walking energy consumption is reduced, and has excellent interpersonal coordination. Therefore, passive exoskeletons have received extensive attention.

For human body, during the heel-strike phase of walking, impact is generated between heel and the ground, which causes energy dissipation. When human body pushes off the ground, the ankle joint makes the largest power and does external work, providing the major source of power for the human body to move forward. Therefore, the use of exoskeletons to reduce the energy dissipation during the heel-strike phase and the energy output from the ankle joint plantarflexors during the push-off phase may effectively improve the walking efficiency of the human body and reduce the metabolic consumption caused by walking.

SUMMARY

In view of the above defects or the needs for improvement in the conventional technology, the present disclosure provides a clutch adapted for exoskeletons and ankle joint assisted exoskeleton, which may reduce the impact energy loss during the heel-strike phase of human walking, and at the same time provide assistive moment for the ankle joint during the push-off phase, reduce the energy output from the ankle joint plantarflexors, thereby effectively improving the walking efficiency of the human body, and reducing the metabolic consumption caused by walking.

In order to achieve the above purpose, in an aspect of the present disclosure, a clutch adapted for an exoskeleton is provided. The clutch includes a clutch lower base plate, a clutch upper base plate, a clutch roller, a clutch roller ratchet ring, a clutch trigger, a clutch pawl, a clutch pawl spring, a clutch trigger torsional spring, a clutch roller torsional spring, a clutch trigger positioning shaft, and a clutch pawl positioning shaft. The clutch upper base plate and the clutch lower base plate are arranged at intervals. Two ends of the clutch trigger positioning shaft are respectively connected to the clutch upper base plate and the clutch lower base plate. The clutch trigger and the clutch trigger torsional spring are sleeved on the clutch trigger positioning shaft, and two ends of the clutch trigger torsional spring are respectively fixedly connected to the clutch trigger and the clutch lower base plate. Two ends of the clutch pawl positioning shaft are respectively connected to the clutch lower base plate and the clutch upper base plate. The clutch pawl spring and the clutch pawl are sleeved on the clutch pawl positioning shaft. Two ends of the clutch pawl spring are respectively and fixedly connected to the clutch lower base plate and the clutch pawl. Two ends of the clutch roller are respectively and rotatably connected to the clutch lower base plate and the clutch upper base plate. Two ends of the clutch roller torsional spring are respectively connected to the clutch lower base plate and the clutch roller. The clutch roller ratchet ring is arranged on one end of the clutch roller adjacent to the clutch upper base plate. The clutch pawl is detachably connected to the clutch roller ratchet ring. The clutch trigger is movably connected to the clutch pawl. The clutch trigger drives the clutch pawl to rotate by rotating, such that the clutch pawl abuts against the clutch roller ratchet ring or the clutch pawl is disengaged from the clutch roller ratchet ring, and that the clutch is in a locked state or an open state. When the clutch is in a locked state, the clutch roller is rotatable unidirectionally, and when the clutch is in the open state, the clutch is rotatable bidirectionally.

Additionally, the clutch roller and the clutch trigger are connected to an energy storage mechanism of the exoskeleton, and the energy storage mechanism rotates as the human body walks, and drives the clutch trigger and the clutch roller to rotate respectively.

Furthermore, one side of the clutch roller is provided with a torsional spring hole. A bottom portion of the torsional spring hole is evenly provided with a torsional spring position-limiting through hole. The clutch roller torsional spring is located in the torsional spring hole, and one end of the clutch roller torsional spring is fixed in the torsional spring position-limiting through hole, while the other end of the clutch roller torsional spring is fixed in the torsional spring position-limiting through hole of the clutch lower base plate. Another side of the clutch roller is formed with an arc gear. An arc gear is formed at the inner side of the clutch roller ratchet ring, and ratchet teeth arranged at intervals are formed at the outer side of the clutch roller ratchet ring. The inner side of the clutch roller ratchet ring is engaged with the clutch roller to be fixed together, and the outer side of the clutch roller ratchet ring is detachably connected to the clutch pawl.

In addition, the clutch trigger includes an oval connecting portion and a pawl. The connecting portion is rotatably connected to the clutch trigger positioning shaft. The pawl is connected to one end of the connecting portion, and the pawl cooperates with the clutch pawl to adjust the working state of the clutch. One end of the connecting portion away from the pawl is provided with a wire hole, and the wire hole is configured for a calf clutch trigger cord to pass therethrough. One end of the calf clutch trigger cord is connected to the connecting portion, and the other end of the calf clutch trigger cord is configured to connect the energy storage mechanism of the exoskeleton.

Further, an engaging protrusion is formed on the clutch pawl, and the engaging protrusion cooperates with the pawl to adjust the working state of the clutch.

Moreover, the clutch further includes a clutch trigger position-limiting shaft, and two ends of the clutch trigger position-limiting shaft are respectively fixed on the clutch lower base plate and the clutch upper base plate, so as to limit the position to which the clutch trigger is restored.

Moreover, the clutch further includes an ankle joint assisted cord stopper. The ankle joint assisted cord stopper is arc-shaped, and two ends of the ankle joint assisted cord stopper are respectively fixed in the arc-shaped grooves of the clutch lower base plate and the clutch upper base plate.

Additionally, the stiffness and spring wire diameter of the clutch pawl spring are respectively less than the stiffness and spring wire diameter of the clutch trigger torsional spring, and the initial preload force of the clutch pawl spring is also less than the initial preload force of the clutch trigger torsional spring.

In another aspect of the present disclosure, an ankle joint assisted exoskeleton is provided. The exoskeleton includes a first passive exoskeleton, and the first passive exoskeleton includes the above-mentioned clutch, an energy storage mechanism and a strike-recipient mechanisms. The energy storage mechanism is connected to the strike-recipient mechanisms, and the clutch is connected to the energy storage mechanism and the strike-recipient mechanisms. The strike-recipient mechanisms collect the energy that is generated by heel impacting the ground through rotation deformation when human body walks, and at the same time drive the energy storage mechanism to deform. The energy storage mechanism stores the energy from the strike-recipient mechanisms through elastic deformation, and is used to assist the ankle joint during the push-off phase. In the meantime, the energy storage mechanism drives the clutch to rotate, and the calf clutch performs time-division regulation on the energy storage mechanism through rotation.

Moreover, the energy storage mechanism is connected to the clutch trigger and the clutch roller respectively through the calf clutch trigger cord and the ankle joint assisted cord. The energy storage mechanism includes a ratchet shaft, and the ratchet shaft is connected to the strike-recipient mechanisms. The calf clutch trigger cord and the ankle joint assisted cord are respectively and indirectly connected to the ratchet shaft. The exoskeleton further includes a second passive exoskeleton. When in use, the first passive exoskeleton and the second passive exoskeleton are in a mirror-image relationship with respect to the sagittal plane of the human body, and the two strike-recipient mechanisms are adapted to be respectively worn on the left and right feet.

In general, comparing the above technical solution conceived by the present disclosure with the conventional technology, the clutch adapted for exoskeleton and ankle joint assisted exoskeleton provided by the present disclosure mainly have the following advantageous effects:

1. The clutch pawl is detachably connected to the clutch roller ratchet ring, and the clutch trigger is movably connected to the clutch pawl. The clutch trigger drives the clutch pawl to rotate by rotating to make the clutch pawl abuts against the clutch roller ratchet ring or disengages the clutch pawl from the clutch roller ratchet ring, thereby making the clutch to be in a locked state or an open state. When applying the above to exoskeleton, it is possible to conveniently realize the time-division regulation of the energy storage mechanism of the exoskeleton, so as to better collect and release energy to assist the ankle joint during the push-off phase.

2. Through the configuration of the spring, the energy storage may be conveniently realized through elastic deformation and the deformation recovery may be realized under the action of elastic force.

3. Two ends of the clutch trigger position-limiting shaft are respectively fixed on the clutch lower base plate and the clutch upper base plate, so as to limit the position to which the clutch trigger is restored. In this manner, when the clutch is in the original position, the position of the clutch trigger makes the clutch pawl rightly disengage from the clutch roller ratchet ring, and the calf clutch is in an open state. In this way, it is possible to enhance the triggering response speed of the clutch, and the clutch pawl may make the clutch turn to the locked state by rotating at a small angle. Accordingly, the small amount of movement of the calf clutch trigger cord may trigger the clutch to turn to the locked state, so that a high response speed may be achieved.

4. The ankle joint assisted cord stopper is arc-shaped, and two ends of the ankle joint assisted cord stopper are respectively fixed in the arc-shaped grooves of the clutch lower base plate and the clutch upper base plate, so as to limit the position of the ankle joint assisted cord, thereby preventing the ankle joint assisted cord from falling off the groove.

5. The present disclosure analyzes the energy flow of the ankle joint in the process of human walking, finds the action intervals where the human foot and ankle joint do positive work and negative work respectively, and collects and stores the negative work generated during the heel-strike phase through the strike-recipient mechanism. This process also reduces the impact on the heel of the human body during the heel-strike phase, and then continues to collect the negative work generated during the dorsiflexion of the ankle joint through the ankle joint assisted cord, thereby realizing the energy collection of the main negative work section of the ankle complex during the whole process of human walking. Thereafter, through the periodic change of the ankle joint angle when the human body walks, the energy distribution mechanism is triggered in time to release the stored energy, and the human ankle joint is provided with assistance when the human foot pushes off the ground, thereby reducing the positive work done by the ankle joint of the human body. Compared with the conventional technology, the present disclosure performs energy analysis during the entire section of the human body walking process, optimizes the walking energy of the human body through energy distribution, and improves the walking efficiency of the human body.

DESCRIPTION OF THE EMBODIMENTS

In order to make the purpose, technical solutions and advantages of the present disclosure clearer, the present disclosure will be further described in detail below with reference to the accompanying drawings and embodiments. It should be understood that the specific embodiments described herein are only used to explain the present disclosure, but not to limit the present disclosure. In addition, the technical features involved in the various embodiments of the present disclosure described below may be combined with each other as long as they do not conflict with each other.

Figure 1:
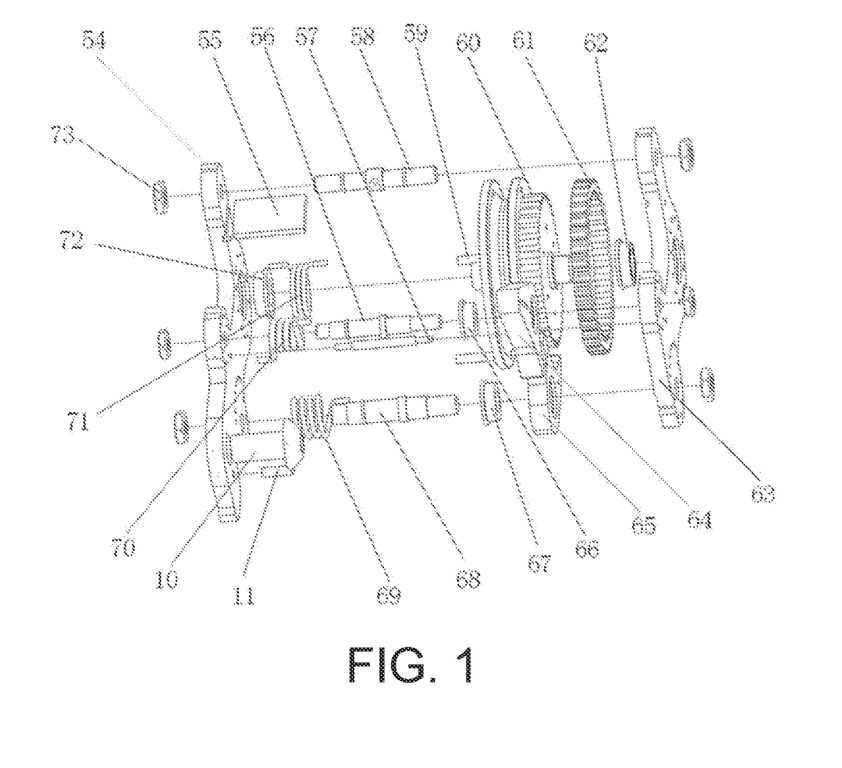
FIG. 1 is an exploded schematic view of a clutch adapted for an exoskeleton provided by the present disclosure.
Figure 2:
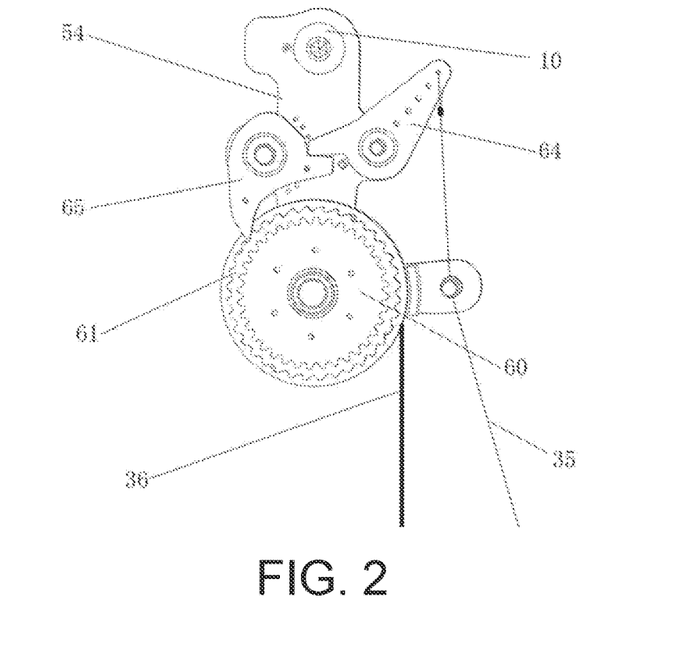
FIG. 2 is a two-dimensional schematic plan view of the clutch in FIG. 1.
Figure 3:
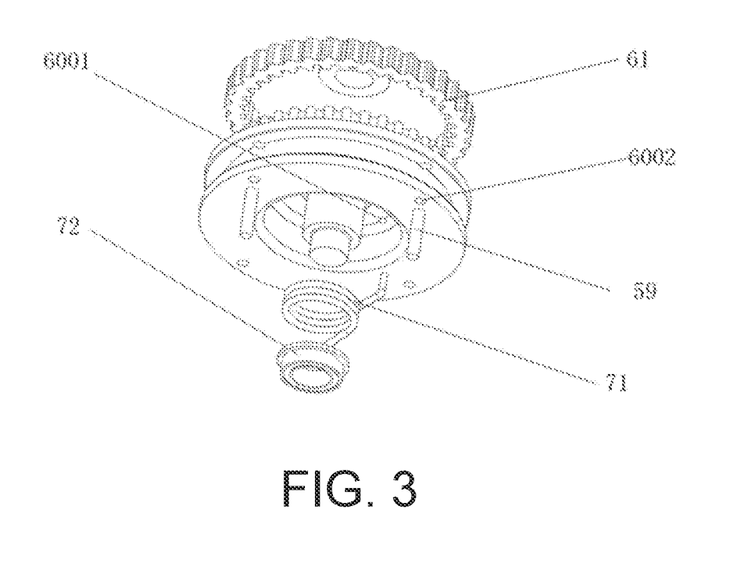
FIG. 3 is a partial schematic view of the clutch in FIG. 1.

Please refer to FIG. 1, FIG. 2 and FIG. 3, the present disclosure provides a clutch adapted for an exoskeleton. The clutch includes a calf clutch trigger cord guide wheel 21, a calf clutch trigger cord 35, an ankle joint assisted cord 36, a clutch lower base plate 54, an ankle joint assisted cord stopper 55, a clutch trigger positioning shaft 56, a clutch trigger position-limiting shaft 57, a clutch trigger wire guide shaft 58, an ankle joint assisted cord fixing portion 59, a clutch roller 60, a clutch roller ratchet ring 61, a first clutch roller bearing 62, a clutch upper base plate 63, a clutch trigger 64, a clutch pawl 65, a clutch trigger bearing 66, a clutch pawl bearing 67, a clutch pawl positioning shaft 68, a clutch pawl spring 69, a clutch trigger torsional spring 70, a clutch roller torsional spring 71, a second clutch roller bearing 72, and a clutch fixing nut 73.

When the clutch is working, the clutch is fixed on the strike-recipient mechanism of the exoskeleton through the clutch tightening bolt 10 and the clutch positioning screw 11. The clutch lower base plate 54 has an irregular shape, and is provided with a plurality of shaft holes, torsional spring position-limiting holes and bearing holes. The clutch lower base plate 54 is connected to the clutch upper base plate 63 and arranged at intervals. Two ends of the clutch trigger positioning shaft 56, two ends of the clutch trigger position-limiting shaft 57, two ends of the clutch trigger wire guide shaft 58, and two ends of the clutch pawl positioning shaft 68 pass through the shaft holes of the clutch lower base plate 54 and the clutch upper base plate 63 respectively, and are respectively connected to clutch fixing nuts 73, such that the relative distance between the clutch upper base plate 63 and the clutch lower base plate 54 is defined.

The clutch trigger bearing 66 and the clutch trigger torsional spring 70 are sleeved on the clutch trigger positioning shaft 56. The clutch trigger torsional spring 70 has a left-hand rotation, and one end of the clutch trigger torsional spring 70 is fixed on the torsional spring position-limiting hole of the clutch lower base plate 54, and the other end of the clutch trigger torsional spring 70 is fixed in the torsional spring position-limiting hole of the clutch trigger 64. The clutch trigger bearing 66 is disposed in the bearing hole of the clutch trigger 64, and one end of the clutch trigger positioning shaft 56 passes through the clutch trigger bearing 66 and is connected to the clutch lower base plate 54. The clutch trigger bearing 66 is a flange bearing.

In this embodiment, two ends of the clutch trigger positioning shaft 56 are threaded to form a threaded connection with the clutch fixing nut 73, and a plurality of shaft steps are formed in the middle portion. The first shaft step structure in the middle portion cooperates with the clutch trigger bearing 66 to limit the movement of the clutch trigger 64 along the clutch trigger positioning shaft 56. The second shaft step structure and the third shaft step structure on both sides of the first shaft step structure are respectively configured to define the relative position between the clutch trigger positioning shaft 56 and the clutch lower base plate 54, as well as the relative position between the clutch trigger positioning shaft 56 and the clutch upper base plate 63.

The clutch trigger 64 includes an oval connecting portion and a pawl. The bearing hole is opened on the connecting portion, and the pawl is connected to one end of the connecting portion, which cooperates with the clutch pawl 65 to adjust the working state of the clutch. One end of the connecting portion away from the pawl is provided with a wire hole, and the wire hole is configured for the calf clutch trigger cord 35 to pass through. One end of the calf clutch trigger cord 35 is connected to the connecting portion, and the other end of the calf clutch trigger cord 35 passes through the calf clutch trigger cord guide nut 29 and is connected to the calf clutch trigger cord guide wheel 21.

Two ends of the clutch pawl positioning shaft 68 are respectively formed with threads, and a plurality of shaft steps are formed in the middle. The clutch pawl positioning shaft 68 defines the relative position of the clutch lower base plate 54 and the clutch upper base plate 63 respectively through the shaft step. The clutch pawl bearing 67 is sleeved on the clutch pawl positioning shaft 68, the clutch pawl bearing 67 defines the movement of the clutch pawl bearing 67 in the direction of the clutch lower base plate 54 through the shaft step on the clutch pawl positioning shaft 68, and at the same time limits the movement of the clutch pawl bearing 67 toward the clutch upper base plate 63 through the flange edge of the clutch pawl 65.

The clutch pawl spring 69 is sleeved on the clutch pawl positioning shaft 68. The clutch pawl spring 69 has right-handed rotation, and one end of the clutch pawl spring 69 is fixed in the torsional spring position-limiting hole of the clutch lower base plate 54, and the other end of the clutch pawl spring 69 is fixed in the torsional spring position-limiting hole of the clutch pawl 65. The clutch pawl bearing 67 is a flange bearing, which is fixed in the bearing hole of the clutch pawl 65. In the embodiment, the clutch pawl 65 is formed with an engaging protrusion, and the engaging protrusion cooperates with the pawl to adjust the working state of the clutch.

The two opposite sides of the clutch roller 60 are respectively connected to the clutch upper base plate 63 and the clutch lower base plate 54 respectively through the second clutch roller bearing 72 and the first clutch roller bearing 62. The second clutch roller bearing 72 is a flange bearing, which is embedded in the bearing holes of the clutch lower base plate 54 and the clutch upper base plate 63. In the embodiment, the clutch roller 60 is provided with a connecting shaft, and two ends of the connecting shaft are respectively arranged in the second clutch roller bearing 72 and the first clutch roller bearing 62.

One side of the clutch roller 60 is provided with a torsional spring hole, the bottom portion of the torsional spring hole is evenly opened with a clutch roller torsional spring hole 6001. The clutch roller torsional spring 71 is located in the torsional spring hole, and one end of the clutch roller torsional spring 71 is fixed in the clutch roller torsional spring hole 6001, and the other end of the clutch roller torsional spring 71 is fixed in the torsional spring position-limiting hole of the clutch lower base plate 54. The clutch roller torsional spring 71 has a left-handed rotation.

An arc gear is formed on the other side of the clutch roller 60, an arc gear is formed on the inner side of the clutch roller ratchet ring 61, and ratchet teeth arranged at intervals are formed on the outer side of the clutch roller ratchet ring 61. The inner side of the clutch roller ratchet ring 61 is engaged with the clutch roller 60 to be fixed together, and the outer side of the clutch roller ratchet ring 61 is detachably connected to the clutch pawl 65, so that the clutch roller 60 is only rotatable unidirectionally when the clutch is in a locked state. In the unlocked state, the clutch roller 60 is rotatable bidirectionally.

In the embodiment, the material of the clutch roller 60 is magnesium alloy with low quality and strength. The material of the clutch roller ratchet ring 61 is steel with high quality and strength. The outer circumference of the clutch roller 60 is also provided with a cord groove, which is used for accommodating the ankle joint assisted cord 36. The clutch roller 60 is opened with four evenly distributed clutch roller fixing member holes 6002, and the clutch roller fixing member holes 6002 penetrate through the opposite groove walls of the cord groove. The cord groove surrounds the circumferential direction of the clutch roller 60. The four ankle joint assisted cord fixing members 59 are respectively fixed in the four clutch roller fixing member holes 6002, so as to fix one end of the ankle joint assisted cord 36 and prevent the ankle joint assisted cord 36 from falling off the clutch roller 60.

Two ends of the clutch trigger position-limiting shaft 57 are respectively fixed on the clutch lower base plate 54 and the clutch upper base plate 63 to limit the position to which the clutch trigger 64 is restored. In this manner, when the clutch is in the original position, the clutch trigger 64 is positioned in a manner that the clutch pawl 65 may be rightly disengaged from the clutch roller ratchet ring 61 and the calf clutch is in an open state. In this way, it is possible to enhance the triggering response speed of the clutch, and the clutch pawl 65 may make the clutch turn to the locked state by rotating at a small angle. Accordingly, the small amount of movement of the calf clutch trigger cord 35 may trigger the clutch to turn to the locked state, so that a high response speed may be achieved.

The ankle joint assisted cord stopper 55 is arc-shaped, and two ends of the ankle joint assisted cord stopper 55 are respectively fixed in the arc-shaped grooves of the clutch lower base plate 54 and the clutch upper base plate 63, so as to limit the position of the ankle joint assisted cord 36 to prevent it from falling of the groove. The ankle joint assisted cord 36 is wound on the clutch roller 60 counter-clockwise.

Two ends of the clutch trigger wire guide shaft 58 are respectively formed with external threads, and a shaft step is formed in the middle to limit the relative distance between the clutch lower base plate 54 and the clutch upper base plate 63. A guide hole is formed between the clutch lower base plate 54 and the clutch upper base plate 63, and rounded corners are formed on both sides of the guide hole. The guide hole is used for the calf clutch trigger cord 35 to pass through so as to serve a guiding function.

In the embodiment, the stiffness and spring wire diameter of the clutch pawl spring 69 are less than those of the clutch trigger torsional spring 70, and the initial preload force of the clutch pawl spring 69 is also less than the initial preload force of the clutch trigger torsional spring 70. In the non-triggered state, because the preload force of the clutch trigger torsional spring 70 is greater than the preload force of the clutch pawl spring 69, the clutch trigger 64 may make the clutch pawl 65 to be in a separate state under the action of the clutch pawl spring 69. Under the circumstances, the clutch is in an unlocked state, and the clutch roller 60 is rotatable bidirectionally. When the clutch trigger 64 is separated from the clutch pawl 65 under the action of the calf clutch trigger cord 35, the clutch pawl 65 rebounds under the action of the clutch pawl spring 69, and the clutch pawl 65 abuts against the clutch roller ratchet ring 61. Under the circumstances, the clutch is in a locked state, and the clutch roller is only rotatable unidirectionally.

The inner diameters of the clutch pawl spring 69 and the clutch trigger torsional spring 70 after rotating 180° are larger than the clutch trigger positioning shaft 56 and the clutch pawl positioning shaft 68 respectively, which prevents the torsional spring from locking when rotated at a small angle. In addition, the clutch roller torsional spring 71 has a certain preload force in the initial position, so that the ankle joint assisted cord 36 may be restored under the action of the clutch roller torsional spring 71.

Please refer to FIG. 4, FIG. 5, FIG. 6, FIG. 7, and FIG. 8(a) to FIG. 8(e), the present disclosure further provides an ankle joint assisted exoskeleton. The exoskeleton includes a left passive exoskeleton and a right passive exoskeleton. The left passive exoskeleton and the right passive exoskeleton are respectively fixed on the left foot and the right foot of the human body when in use. When the human body walks, the left passive exoskeleton and the right passive exoskeleton work alternately with the movement of the left and right feet of the human body. When in a static state, the left passive exoskeleton and the right passive exoskeleton are in a mirror image relationship with the sagittal plane of the human body.

Figure 4:
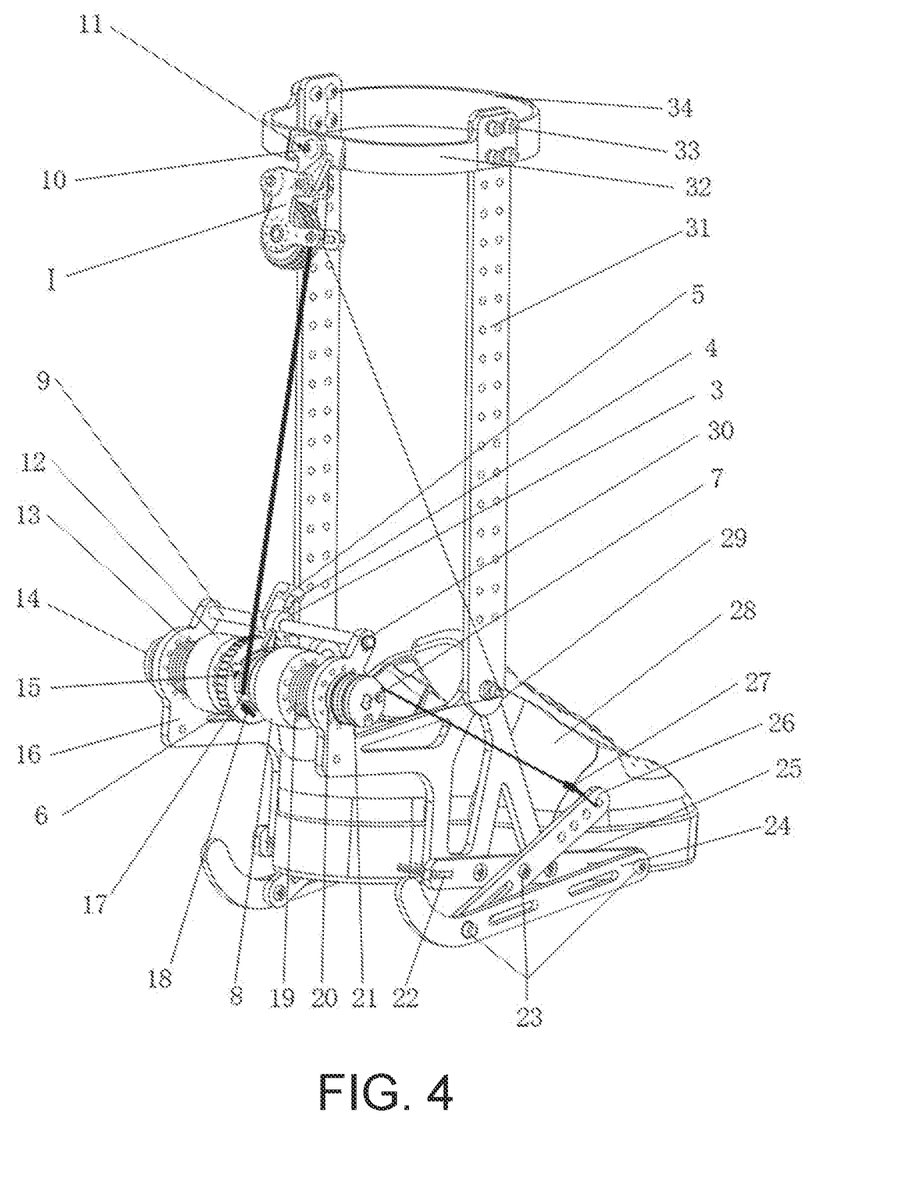
FIG. 4 is a three-dimensional schematic view of an ankle joint exoskeleton provided by the present disclosure.

The right passive exoskeleton includes a clutch I, an energy storage mechanism II, and a strike-recipient mechanism III. The energy storage mechanism II is connected to the strike-recipient mechanism III, and the clutch I is connected to the energy storage mechanism II and the strike-recipient mechanism III. The clutch I is the above-mentioned clutch.

The strike-recipient mechanism III collects the energy that is generated by heel impacting the ground through rotation deformation when human body walks, and at the same time drives the energy storage mechanism II to deform. The energy storage mechanism II stores the energy from the strike-recipient mechanism III through elastic deformation, and is used to assist the ankle joint when the human body walks and pushes off. In the meantime, the energy storage mechanism II drives the clutch to rotate, and the calf clutch performs time-division regulation on the energy storage mechanism II through rotation.

Figure 5:
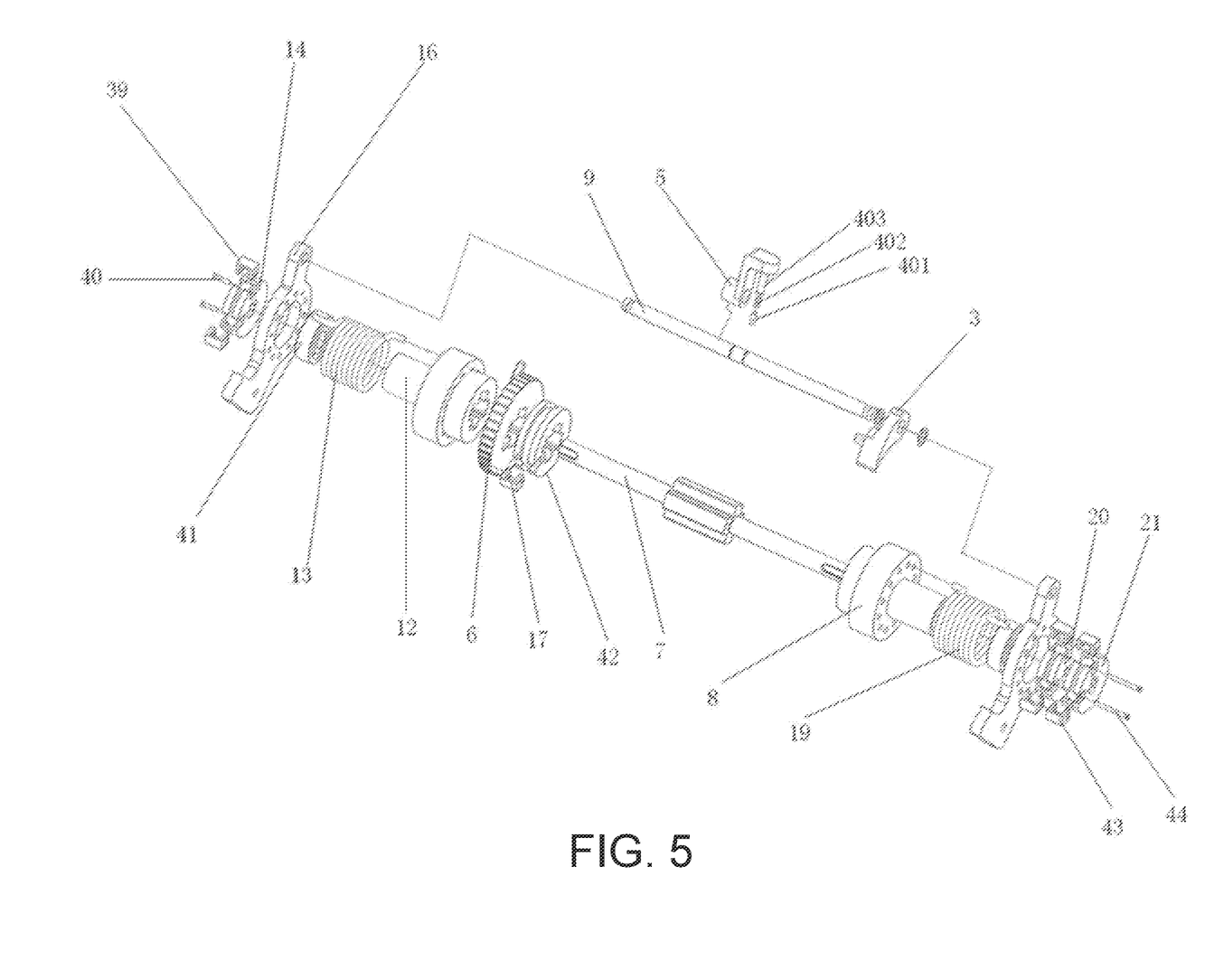
FIG. 5 is an exploded schematic view of an energy storage mechanism of the ankle joint exoskeleton in FIG. 4.

The energy storage mechanism includes a ratchet shaft 7, two clutch connecting plates 16 arranged at intervals, a foot guide wheel disk connecting member 40, a foot guide wheel disk 39, a left foot guide wheel 14, a right foot guide wheel 20, a ratchet shaft bearing 41, a left torsional spring 13, a left torsional spring stop plate 12, a ratchet wheel 6, a middle guide wheel disk 17, a middle guide wheel 42, a calf clutch trigger cord guide wheel disk 43, a ratchet pawl shaft 9, a ratchet pawl stopper 5, a detent 4, a ratchet pawl 3, a foot energy storage cord 37, a right torsional spring stop plate 8, and a right torsional spring 19.

The middle guide wheel 42, the ratchet wheel 6, the left torsional spring stop plate 12, the right torsional spring stop plate 8, the left torsional spring 13, the right torsional spring 19, the ratchet shaft bearing 41, the left foot guide wheel 14 and the right foot guide wheel 20 are sleeved on the ratchet shaft 7. A rectangular spline is formed in the middle of the ratchet shaft 7, and the middle guide wheel 42, the ratchet wheel 6, the left torsional spring stop plate 12, and the right torsional spring stop plate 8 are fastened and connected together through the rectangular spline grooves formed by themselves and the rectangular spline on the ratchet shaft 7. The middle guide wheel disk 17 is arranged on the middle guide wheel 42, and the ankle joint assisted cord 36 is fixed on the middle guide wheel disk 17 through the ankle joint assisted cord aluminum sleeve 18. The ratchet wheel 6 is disposed adjacent to the middle guide wheel 42, and both are located between the left torsional spring stop plate 12 and the right torsional spring stop plate 8. The depths of the rectangular spline grooves of the left torsional spring stop plate 12 and the right torsional spring stop plate 8 may respectively define the positions of the left torsional spring stop plate 12 and the right torsional spring stop plate 8 on the ratchet shaft 7. The left torsional spring 13 is fixed on the left torsional spring stop plate 12, and the right torsional spring 19 is fixed on the right torsional spring stop plate 8. Two ends of the left torsional spring 13 are respectively fixed on the clutch connecting plate 16 and in a position-limiting hole of and the left torsional spring stop plate 12. Two ends of the right torsional spring 19 are respectively fixed on another clutch connecting plate 16 and in the position-limiting hole of the right torsional spring stop plate 8. The two ratchet shaft bearings 41 are respectively disposed on the two clutch connecting plates 16, and two ends of the ratchet shaft 7 pass through the two ratchet shaft bearings 41 respectively. The ratchet shaft bearing 41 is configured to reduce the frictional force when the energy storage mechanism rotates, and perform position-limiting on the ratchet shaft 7.

The outer sides of the two clutch connecting plates 16 are respectively provided with the left foot guide wheel 14 and the right foot guide wheel 20. The left foot guide wheel 14 and the right foot guide wheel 20 are fixed through the cooperation between the rectangular spline with the spline grooves on the ratchet shaft 7 respectively. The calf clutch trigger cord guide wheel 21 is arranged on one side of the right foot guide wheel 20 away from the middle guide wheel 42, and the fixing method of the calf clutch trigger cord guide wheel 21 on the ratchet shaft 7 is the same as the fixing method of the left foot guide wheel 14 and the right foot guide wheel 20.

The two foot guide wheel disks 39 are respectively fixed on the left foot guide wheel 14 and the right foot guide wheel 20 through the foot guide wheel disk connecting member 40. The calf clutch trigger cord guide wheel disk 43 is fixed on the calf clutch trigger cord guide wheel 21 through the foot guide wheel disk connecting member 40. The left foot guide wheel 14 and the right foot guide wheel 20 respectively fix the foot energy storage cord 37 through the foot guide wheel disk 39. The calf clutch trigger cord guide wheel 21 fixes the calf clutch trigger cord 35 through the clutch trigger cord guide wheel disk 43.

The ratchet pawl 3 and the ratchet pawl stopper 5 are respectively connected to the ratchet pawl shaft 9, and one end of the detent 4 is connected to the ratchet pawl stopper 5, which cooperates with the ratchet pawl 3 to define the ratchet pawl 3 in a locked state or an open state. Two ends of the ratchet pawl shaft 9 are respectively fixed on the two clutch connecting plates 16 through the ratchet pawl shaft engaging spring 45.

In the embodiment, the detent 4 includes a detent thimble 401, a detent spring 402, and a detent housing 403. The detent spring 402 is accommodated in the detent housing 403, one end of the detent spring 402 is fixed on the detent housing 403, and the other end of the detent spring 402 is connected to the detent thimble 401. The ratchet pawl position-limiting spring 402 changes the position of the ratchet pawl position-limiting thimble 401 relative to the ratchet pawl 3 through elastic deformation, thereby changing the connection state of the ratchet pawl 3 and the ratchet 6. The ratchet pawl stopper 5 is substantially Z-shaped, one end of the ratchet pawl stopper 5 is fixed on the ratchet pawl shaft 9 through the ratchet pawl stopper fixing bolt 46, and the other end of the ratchet pawl stopper 5 is connected to the detent housing 403.

Figure 6:
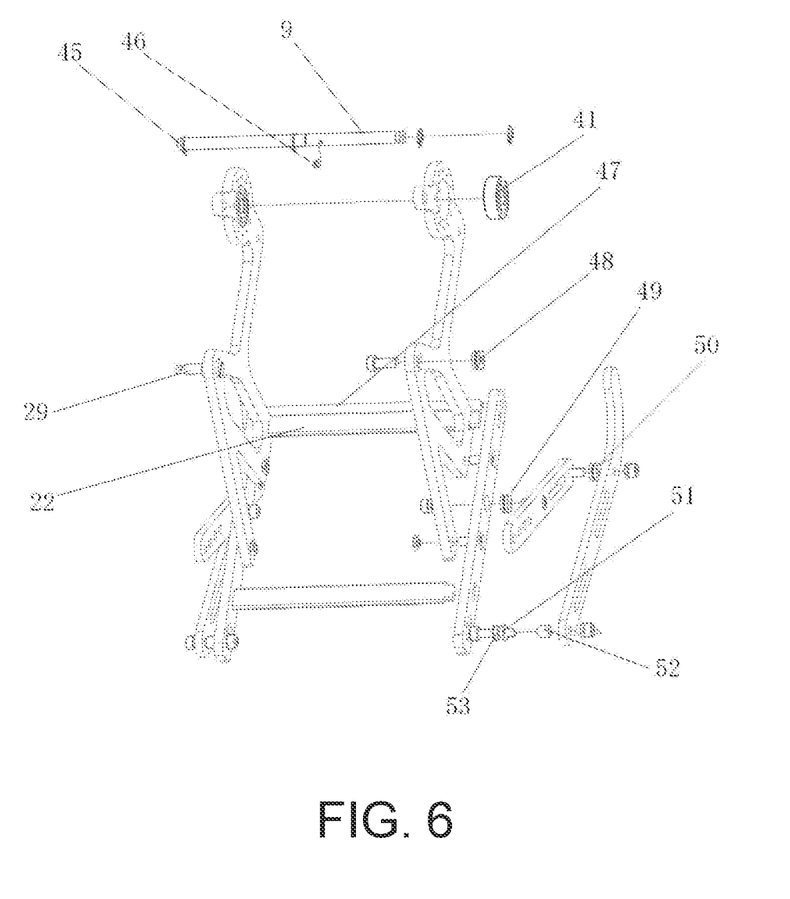
FIG. 6 is an exploded schematic view of a strike-recipient mechanism and a part of energy storage mechanism of the ankle joint exoskeleton in FIG. 4.

The strike-recipient mechanism includes a heel connecting rod 22, a strike-recipient mechanism locking nut 23, a slider connecting rod 24, a rear foot frame 25, a connecting crank 26, a foot energy storage cord aluminum sleeve 27, shoes 28, a pedaling connecting plate, a reinforced carbon tube 47, an ankle joint thrust bearing 48, a first strike-recipient mechanism thrust bearing 49, a second strike-recipient mechanism thrust bearing 50, a first strike-recipient mechanism flange bearing 51, a slider connecting rod positioning sleeve 52, and a second strike-recipient mechanism flange bearing 53. In an embodiment, the pedaling connecting plate may be integrally formed with the clutch connecting plate 16, that is, a one-piece structure.

The pedaling connecting plates are substantially triangular in shape. One side of the two pedaling connecting plates is connected to the two clutch connecting plates 16 respectively, and the corners adjacent to the clutch connecting plates 16 are respectively provided with a calf clutch trigger cord guide nut 29. The calf clutch trigger cord guide nut 29 is configured for the calf clutch trigger cord 35 to pass through, so as to be connected to the calf clutch trigger cord guide wheel 21. The two pedaling connection plates are arranged at intervals, the two heel connecting rods 22 are arranged at intervals, and the reinforced carbon tube 47 is arranged adjacent to one of the heel connecting rods 22. Two ends of the heel connecting rod 22 and the two ends of the reinforced carbon tube 47 are respectively connected to one side of the two pedaling connecting plates through the two rear foot frames 25, and the reinforced carbon tube 47 and the clutch connecting plate 16 are respectively connected to different sides of the pedaling connecting plate. The shoes 28 are fixed on the heel connecting rod 22 and the reinforced carbon tube 47.

The two slider connecting rods 24 and the two connecting cranks 26 are respectively connected to the rear foot frame 25 through the strike-recipient mechanism locking nut 23. One end of the connecting crank 26 is connected to the foot energy storage cord 37 through the foot energy storage cord aluminum sleeve 27, the middle part of the connecting crank 26 is rotatably connected to the rear foot frame 25, and the other end of the connecting crank 26 is rotatably connected to one end of the slider connecting rod 24. The other end of the slider connecting rod 24 is rotatably connected to one end of the rear foot frame 25.

The slider connecting rod 24 and the connecting crank 26 are spaced apart by the second strike-recipient mechanism thrust bearing 50 to reduce friction. The connecting crank 26 and the rear foot frame 25 are spaced apart by the first strike-recipient mechanism thrust bearing 49 to reduce friction. The slider connecting rod 24 and the rear foot frame 25 are connected through the first strike-recipient mechanism flange bearing 51, the slider connecting rod positioning sleeve 52 and the second strike-recipient mechanism flange bearing 53.

The two calf clutch trigger cord guide nuts 29 are also connected to one end of the two calf connecting plates 31 respectively, and the other ends of the two calf connecting plates 31 are respectively connected to two ends of the calf fixing frame 31. Two ends of the calf fixing frame 31 are respectively fixedly connected to the calf velcro strap 34 and the calf connecting plate 31 through the calf connecting plate fixing member 33. The calf clutch is fixed on the calf fixing frame 32 through the clutch tightening bolt 10 and the clutch positioning screw 11.

The strike-recipient mechanism is connected to the left foot guide wheel 14 and the right foot guide wheel 20 of the energy storage mechanism through the foot energy storage cord 37. When the human heel is on the ground, the strike-recipient mechanism moves to drive the left foot guide wheel and the right foot guide wheel of the energy storage mechanism to rotate, and stores energy through the left torsional spring 13 and the right torsional spring 19. The middle guide wheel 42 is connected to the clutch roller of the calf clutch through the ankle joint assisted cord 36, so as to assist the ankle joint to move when the human ankle joint needs to exert force. The calf clutch trigger cord guide wheel 21 is connected to the clutch trigger 64 through the calf clutch trigger cord 35, so as to change the locked state and the open state of the calf clutch. The calf clutch is fixed at the knee joint of the human body through the calf fixing frame 32, the calf velcro strap 34 and the calf connecting plate 31.

Figure 7:
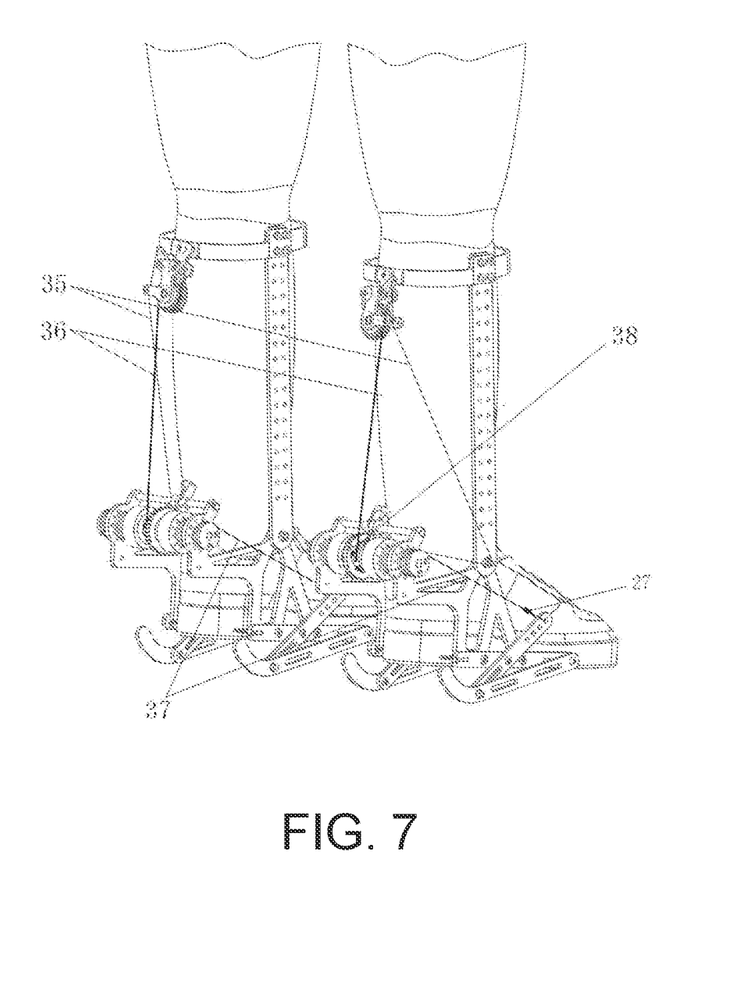
FIG. 7 is a schematic view of the use state of the ankle joint exoskeleton in FIG. 4.

When using the exoskeleton, the user first puts the two shoes 28 on the left and right feet of the human body, and attaches the left passive exoskeleton and the right passive exoskeleton on the left and right calves of the human body through the calf velcro strap 34. After wearing, the human body walks according to the normal walking gait. The two feet of the human body move alternately between the swing phase and the standing phase, and the position where the exoskeleton strike-recipient mechanism of one foot touches on the ground at the moment of heel-strike is set as the working initial position, and the stage is defined as 0% of the gait cycle.

Figure 8A:
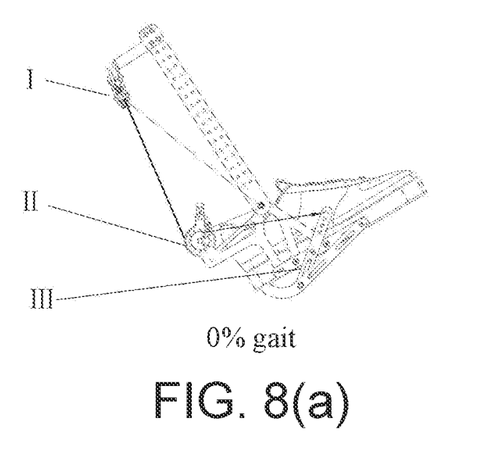
FIG. 8(a), FIG. 8(b), FIG. 8(c), FIG. 8(d), and FIG. 8(e) are diagrams showing the states of the ankle joint exoskeleton in FIG. 4 in different gait periods.
Figure 8B:
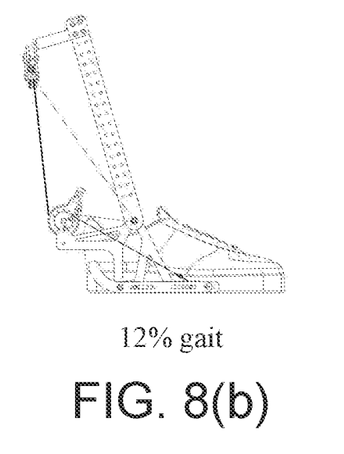

The human gait cycle starts with the human heel touching the ground. When the human body is at 0% of the gait cycle, the strike-recipient mechanism III just touches the ground. Under the action of human gravity, the slider connecting rod 24 of the strike-recipient mechanism III moves downward. Because the foot energy storage cord 37 is wound on the left foot guide wheel 14 and the right foot guide wheel 20 clockwise, from 0% gait cycle to 12% gait cycle, the foot energy storage cord 37 drives the energy storage mechanism II to rotate clockwise. The calf clutch trigger cord 35 is wound around the calf clutch trigger cord guide wheel 21 of the energy storage mechanism II counter-clockwise, and therefore, from 0% gait cycle to 12% gait cycle, the clockwise rotation of the energy storage mechanism II drives the calf clutch trigger cord 35 to pull down, and the clutch trigger 64 that triggers the calf clutch I moves downward. As a result, the calf clutch I is in the unidirectional locking state and can only rotate counter-clockwise (looking at the front direction from the back of the calf). In addition, when the gait cycle proceeds from 0% to 12%, the clockwise rotation of the energy storage mechanism II drives the middle guide wheel 42 to rotate clockwise, the ankle joint assisted cord 36 is relaxed, and because the clutch roller 60 is locked unidirectionally, the clutch roller 60 rotates counter-clockwise under the action of the clutch roller torsional spring 71 to tighten the ankle joint assisted cord 36.

Figure 8C:
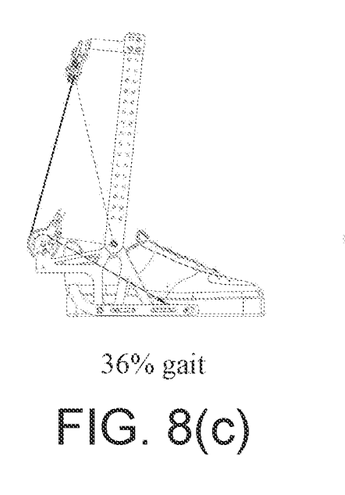

When the human body walks from 12% gait cycle to 36% gait cycle state, the human calf leans forward, and the opening angle between the calf and the sole becomes smaller. Because one side of the ankle joint assisted cord 36 is fixed on the clutch roller 60, and the other side of the ankle joint assisted cord 36 is fixed on the middle guide wheel 42 of the energy storage mechanism II, under the circumstances, the calf clutch I is still in a unidirectional locking state and cannot be rotated clockwise (looking at the front direction from the back of the calf). Under the circumstances, the length of the ankle joint assisted cord 36 cannot be changed. Therefore, when the opening angle between the calf and the sole of the foot becomes smaller, the energy storage mechanism II continues to rotate clockwise under the driving of the calf until the energy storage mechanism II separates the ratchet pawl 3, and the foot energy storage cord 37 is in a relaxed state.

Figure 8D:
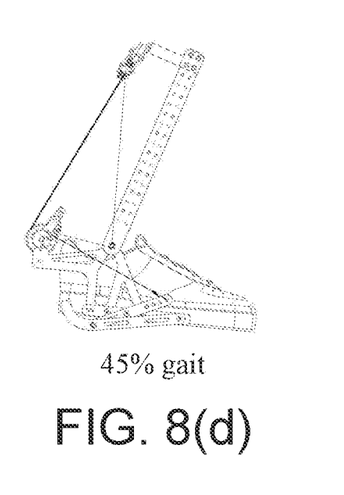

When the human body walks from 36% gait cycle to 45% gait cycle, the ratchet pawl 3 of the energy storage mechanism II has been separated, and the energy storage mechanism II rotates counter-clockwise under the action of the left torsional spring 13 and the right torsional spring 19. The strike-recipient mechanism is driven to recover by the foot energy storage cord 37, which provides assistance for the human foot to pedal away.

Figure 8E:
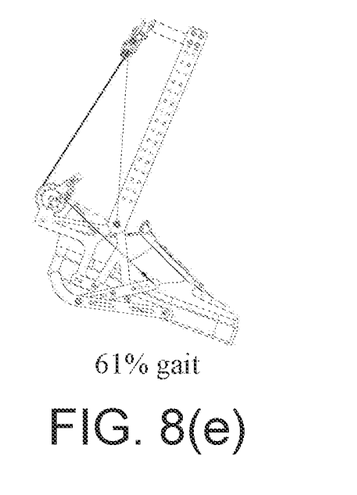

When the human body walks from 45% gait cycle to 61% gait cycle, the foot energy storage cord 37 continues to drive the strike-recipient mechanism to move to provide assistance for the human foot to push off the ground until the strike-recipient mechanism II is completely restored. When the strike-recipient mechanism II is fully recovered, the calf clutch I is still in the unidirectional locking state, the ankle joint assisted cord 36 is still in the shortest state. The energy storage mechanism II continues to rotate counter-clockwise, driving the ankle joint assisted cord 36 to move, providing assistance for the rotation of the ankle joint continuously. After the assistance is completed, the energy storage mechanism returns to its original position, the calf clutch trigger cord guide wheel 21 rotates counter-clockwise, the calf clutch trigger cord 35 and the clutch trigger 64 gradually return to their original positions, and the calf clutch I is in the open state and is rotatable freely bidirectionally. The ratchet pawl 3 of the energy storage mechanism II is also restored under the action of the ratchet pawl reset cord 38, and the energy storage mechanism II is restored to the initial position and can only move unidirectionally.

When the human body walks from 61% gait cycle to 100% gait cycle, the foot is in a suspended state, and the state of the exoskeleton remains unchanged. The two feet are wearing exoskeletons, the two feet are alternately swinging in the air, and the exoskeletons on the two feet also work alternately.

With the exoskeleton provided by the present disclosure, when the sole is gradually level with the ground, the strike-recipient mechanism III acts under the action of the human body's gravity, reducing the impact caused by the heel on the ground when the human body is walking, and transmits energy to the energy storage mechanism II through the foot energy storage cord 37, thereby storing the energy in the left torsional spring 13 and the right torsional spring 19. Under the circumstances, the energy storage mechanism II has turned 120°, and the calf clutch trigger cord 35 is restored under the rotation of the calf clutch trigger cord guide wheel 21, thereby triggering the calf clutch I to perform locking. Under the circumstances, the calf clutch I can only rotate unidirectionally, and the ankle joint assisted cord 36 is restored under the action of the clutch roller torsional spring. When the human body continues to move, from 12% to 45% of the gait cycle, the ankle joint rotates. Because the calf clutch I is in a locked state, the ankle joint assisted cord 36 is in a fixed length, and the energy storage mechanism II rotates continuously through the ankle joint assisted cord 36 until the ankle joint rotates to the maximum dorsiflexion state. The ratchet pawl on the ratchet wheel 6 separates the ratchet pawl 3. After separating the ratchet pawl 3, from 45% to 66% of the gait cycle, the energy storage mechanism II rotates reversely and drives the ankle joint assisted cord 36 through the middle guide wheel 42, thereby providing assistance to the ankle joint when the foot pushes off the ground. The strike-recipient mechanism III is also driven to restore by the reverse rotation of the foot energy storage cord. From 66% to 100% of the gait cycle, the foot is in the swing phase in the air, and the ankle joint does not consume energy. In this way, the assisted exoskeletons of the two feet alternately repeat the above actions, which may reduce the impact on the sole of the foot during the heel-strike phase, and provide assistance to the ankle joint when the foot is pedaling away, thereby improving the walking efficiency of the human body.

Those skilled in the art can easily understand that the above descriptions are only preferred embodiments of the present disclosure, and are not intended to limit the present disclosure. Any modifications, equivalent replacements and improvements made within the spirit and principles of the present disclosure, and so on should be included within the protection scope of the present disclosure.

What is claimed is:

1. A clutch adapted for an exoskeleton, the clutch comprising a clutch lower base plate, a clutch upper base plate, a clutch roller, a clutch roller ratchet ring, a clutch trigger, a clutch pawl, a clutch pawl spring, a clutch trigger torsional spring, a clutch roller torsional spring, a clutch trigger positioning shaft, and a clutch pawl positioning shaft;

wherein the clutch upper base plate and the clutch lower base plate are arranged at intervals, two ends of the clutch trigger positioning shaft are respectively connected to the clutch upper base plate and the clutch lower base plate, the clutch trigger and the clutch trigger torsional spring are sleeved on the clutch trigger positioning shaft, and two ends of the clutch trigger torsional spring are respectively and fixedly connected to the clutch trigger and the clutch lower base plate;

two ends of the clutch pawl positioning shaft are respectively connected to the clutch lower base plate and the clutch upper base plate, the clutch pawl spring and the clutch pawl are sleeved on the clutch pawl positioning shaft, two ends of the clutch pawl spring are respectively and fixedly connected to the clutch lower base plate and the clutch pawl; two ends of the clutch roller are respectively and rotatably connected to the clutch lower base plate and the clutch upper base plate, two ends of the clutch roller torsional spring are respectively connected to the clutch lower base plate and the clutch roller, and the clutch roller ratchet ring is arranged on one end of the clutch roller adjacent to the clutch upper base plate;

the clutch pawl is detachably connected to the clutch roller ratchet ring, the clutch trigger is movably connected to the clutch pawl; the clutch trigger drives the clutch pawl to rotate by rotating, such that the clutch pawl abuts against the clutch roller ratchet ring or the clutch pawl is disengaged from the clutch roller ratchet ring, and that the clutch is in a locked state or an open state; when the clutch is in the locked state, the clutch roller is rotatable unidirectionally; when the clutch is in the open state, the clutch is rotatable bidirectionally.

2. The clutch adapted for the exoskeleton according to claim 1, wherein the clutch roller and the clutch trigger are connected to an energy storage mechanism of the exoskeleton, and the energy storage mechanism rotates as a human body walks, and drives the clutch trigger and the clutch roller to rotate respectively.

3. The clutch adapted for the exoskeleton according to claim 1, wherein one side of the clutch roller is provided with a torsional spring hole, a bottom portion of the torsional spring hole is evenly provided with a torsional spring position-limiting through hole, the clutch roller torsional spring is located in the torsional spring hole, and one end of the clutch roller torsional spring is fixed in the torsional spring position-limiting through hole, while the other end of the clutch roller torsional spring is fixed in the torsional spring position-limiting through hole of the clutch lower base plate; another side of the clutch roller is formed with an arc gear, an inner side of the clutch roller ratchet ring is formed with an arc gear, and ratchet teeth arranged at intervals are formed at an outer side of the clutch roller ratchet ring; the inner side of the clutch roller ratchet ring is engaged with the clutch roller to be fixed together, and the outer side of the clutch roller ratchet ring is detachably connected to the clutch pawl.

4. The clutch adapted for the exoskeleton according to claim 1, wherein the clutch trigger comprises an oval connecting portion and a pawl, the connecting portion is rotatably connected to the clutch trigger positioning shaft; the pawl is connected to one end of the connecting portion, the pawl cooperates with the clutch pawl to adjust a working state of the clutch; one end of the connecting portion away from the pawl is provided with a wire hole, and the wire hole is configured for a calf clutch trigger cord to pass therethrough, one end of the calf clutch trigger cord is connected to the connecting portion, and another end of the calf clutch trigger cord is configured to connect an energy storage mechanism of the exoskeleton.

5. The clutch adapted for the exoskeleton according to claim 4, wherein an engaging protrusion is formed on the clutch pawl, and the engaging protrusion cooperates with the pawl to adjust the working state of the clutch.

6. The clutch adapted for the exoskeleton according to claim 1, wherein the clutch further comprises a clutch trigger position-limiting shaft, and two ends of the clutch trigger position-limiting shaft are respectively fixed on the clutch lower base plate and the clutch upper base plate, so as to limit a position to which the clutch trigger is restored.

7. The clutch adapted for the exoskeleton according to claim 1, wherein the clutch further comprises an ankle joint assisted cord stopper, the ankle joint assisted cord stopper is arc-shaped, and two ends of the ankle joint assisted cord stopper are respectively fixed in arc-shaped grooves of the clutch lower base plate and the clutch upper base plate.

8. The clutch adapted for the exoskeleton according to claim 1, wherein a stiffness and a spring wire diameter of the clutch pawl spring are respectively less than a stiffness and a spring wire diameter of the clutch trigger torsional spring, and an initial preload force of the clutch pawl spring is less than an initial preload force of the clutch trigger torsional spring.

9. An ankle joint assisted exoskeleton, comprising: a first passive exoskeleton, wherein the first passive exoskeleton comprises the clutch as claimed in claim 1, an energy storage mechanism, and strike-recipient mechanisms, the energy storage mechanism is connected to the strike-recipient mechanisms, and the clutch is connected to the energy storage mechanism and the strike-recipient mechanisms, the strike-recipient mechanisms collect an energy that is generated by heels impacting the ground through rotation deformation when the human body walks, and drive the energy storage mechanism to deform; the energy storage mechanism stores the energy from the strike-recipient mechanisms through elastic deformation, and is configured to assist an ankle joint when the human body walks and pushes off, and the energy storage mechanism drives the clutch to rotate; and a calf clutch performs time-division regulation on the energy storage mechanism through rotation.

10. The ankle joint assisted exoskeleton according to claim 9, wherein the energy storage mechanism is connected to the clutch trigger and the clutch roller respectively through a calf clutch trigger cord and an ankle joint assisted cord; the energy storage mechanism comprises a ratchet shaft, and the ratchet shaft is connected to the strike-recipient mechanisms, the calf clutch trigger cord and the ankle joint assisted cord are respectively and indirectly connected to the ratchet shaft; the exoskeleton further comprises a second passive exoskeleton; when in use, the first passive exoskeleton and the second passive exoskeleton are in a mirror-image relationship with respect to a sagittal plane of the human body, and the two strike-recipient mechanisms are adapted to be respectively worn on a left foot and a right foot.

* * * * *